Feb. 20, 1945. W. J. SACKETT 2,370,077
FERTILIZER MIXING AND DISTRIBUTING PLANT
Filed Feb. 18, 1941 6 Sheets-Sheet 1

WITNESS
Inventor
WALTER J. SACKETT
By Edwin F. Samuels
Attorney

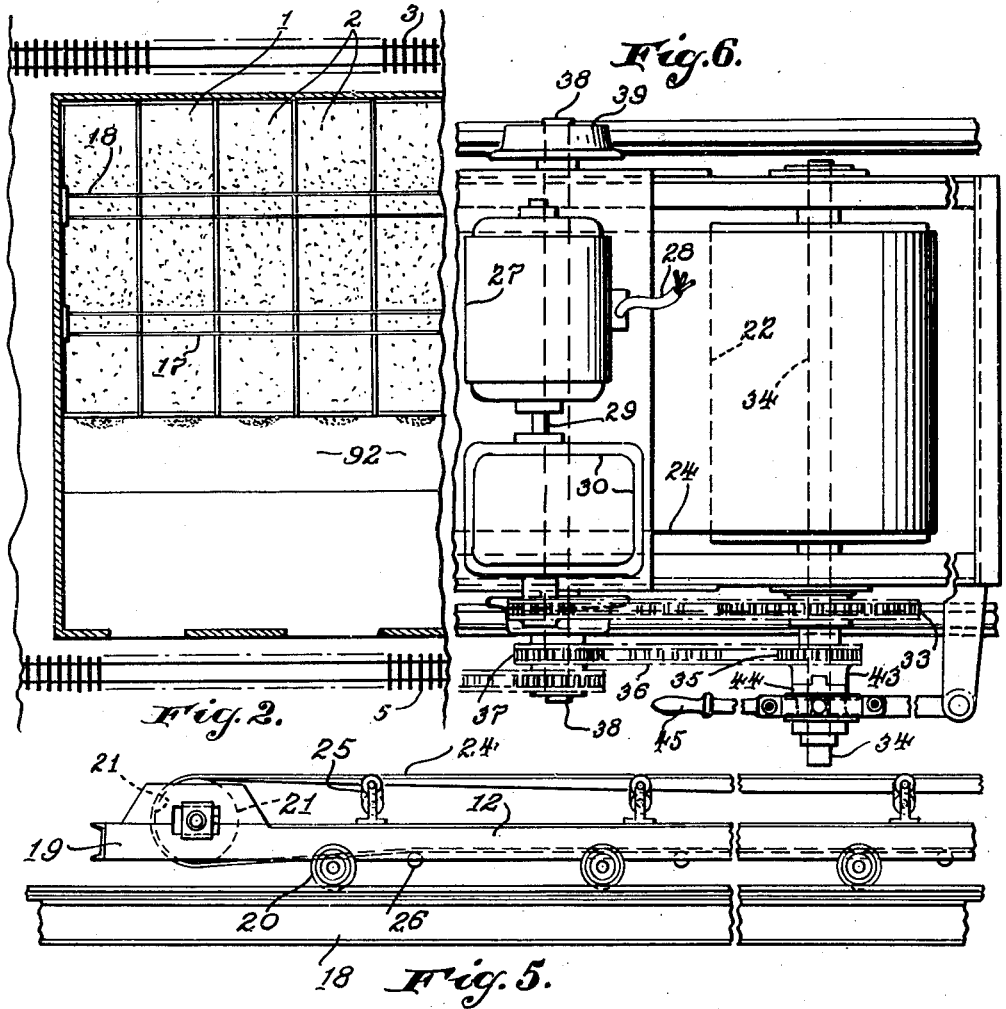

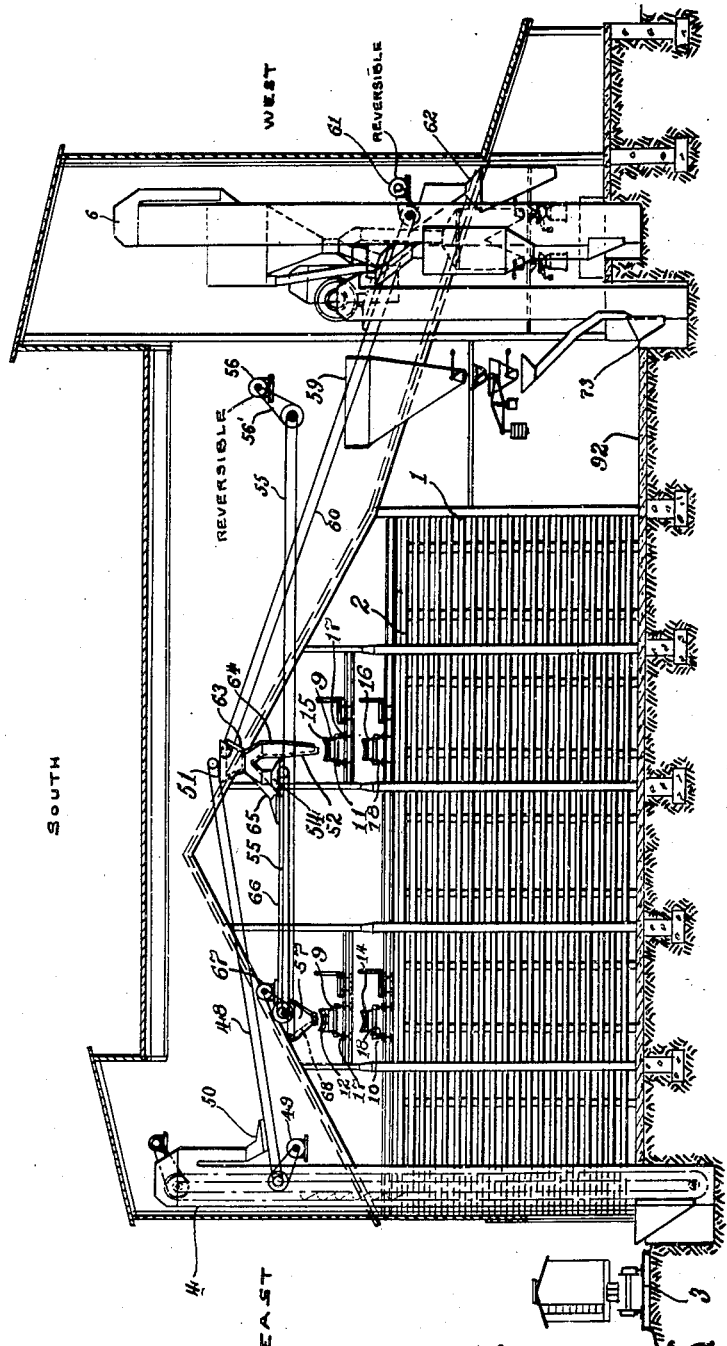

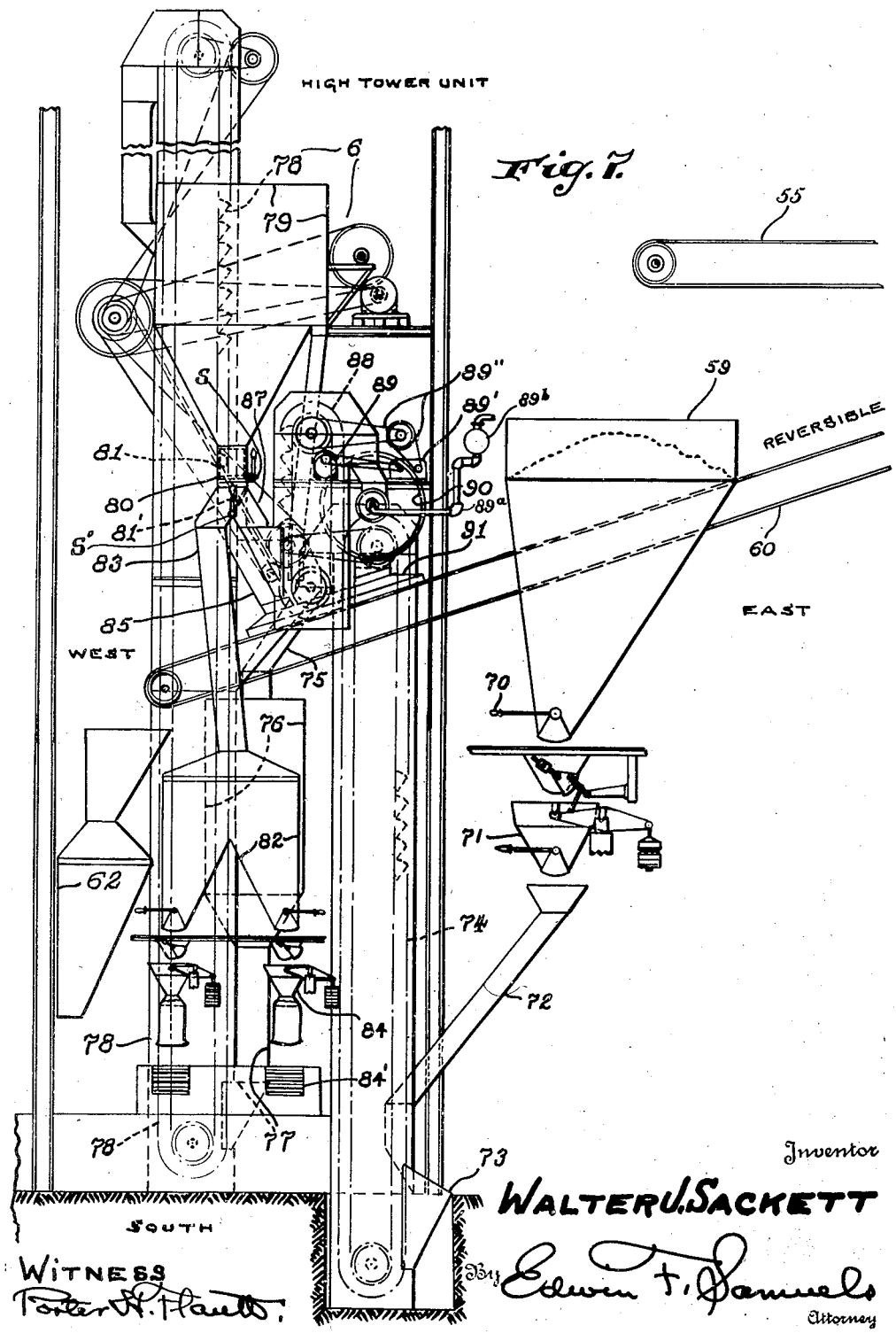

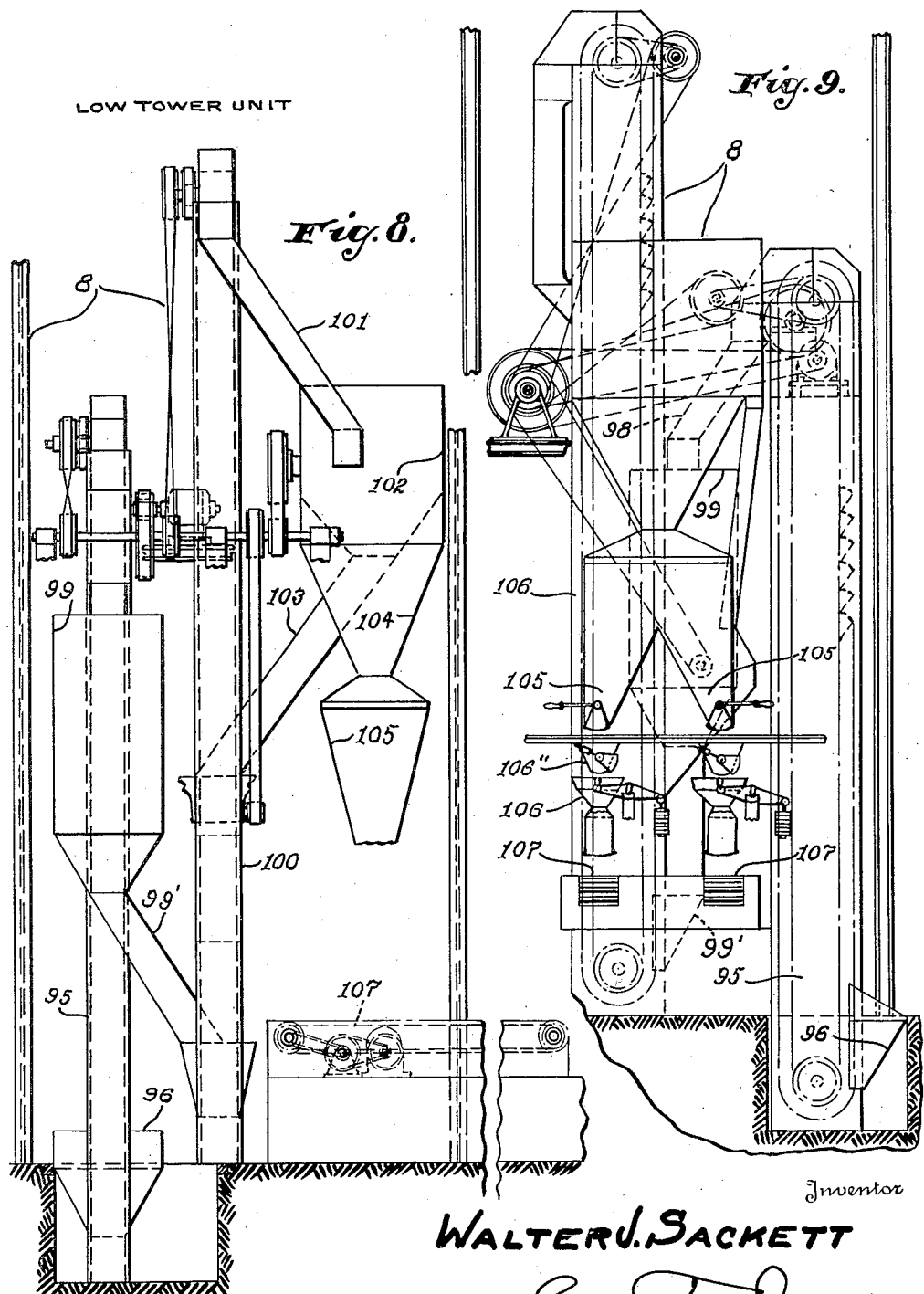

Feb. 20, 1945.   W. J. SACKETT   2,370,077
FERTILIZER MIXING AND DISTRIBUTING PLANT
Filed Feb. 18, 1941   6 Sheets-Sheet 6
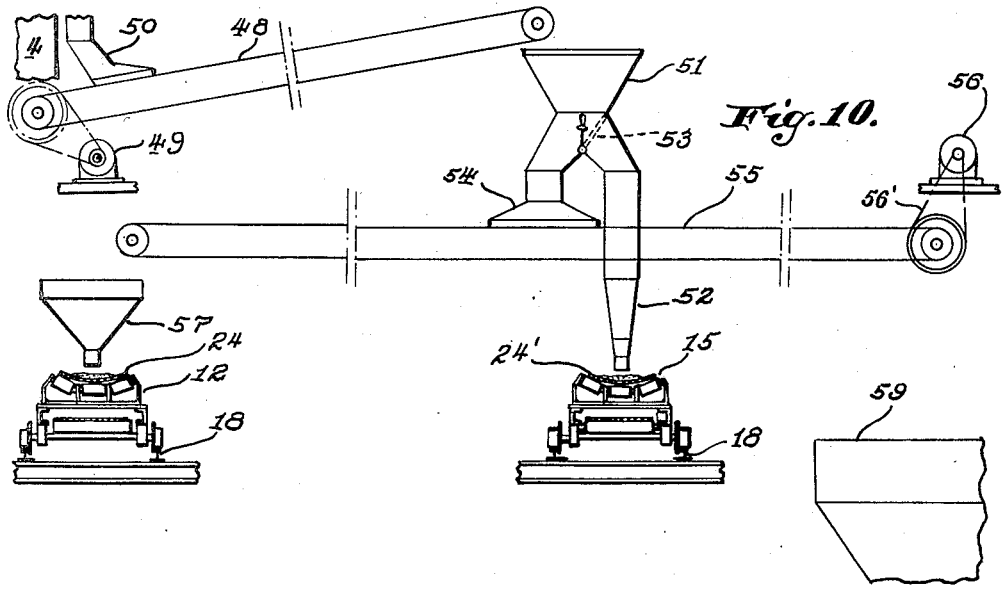
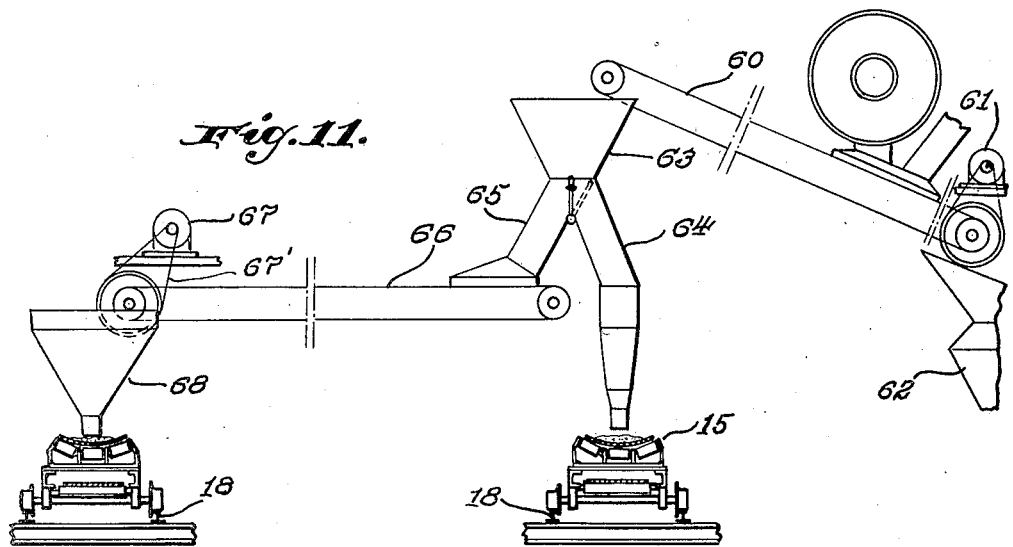
Inventor
WALTER J. SACKETT Patented Feb. 20, 1945

2,370,077

UNITED STATES PATENT OFFICE 2,370,077

FERTILIZER MIXING AND DISTRIBUTING PLANT

Walter J. Sackett, Baltimore, Md., assignor to The A. J. Sackett & Sons Company, Baltimore, Md., a corporation of Maryland Application February 18, 1941, Serial No. 379,535

7 Claims. (Cl. 23—259.1)

The invention relates to a fertilizer mixing and distributing plant though various of the elements are capable of more general application.

The prior existing plants may be divided into two or three classes intended to meet two sets of conditions.

One, where only a few mixtures are used which applies to relatively small plants, the bins are used for storing complete mixtures from which the fertilizer is removed for bagging.

Two, in plants where a large number of different mixtures are prepared, they have bins for storing the mixtures and also for super phosphates and bins for storing two or three bases which are used in making all of the numerous mixtures to be sold. These bases are termed high and low bases respectively. High means high in plant food, i. e., nitrogen and potash.

All of the large plants are on a railroad spur and the cars must be unloaded quickly to avoid demurrage which is a very important item. When super phosphate comes in; which comprises about half the bulk employed, it is the purpose of the plant operator to move it direct to the mixers so that it can be thus disposed of. The other materials are stored in bins and then carried to the mixers, however, there must be storage for super phosphate as it cannot all be used direct from the car.

Both types of prior art plants are unable to handle the current operation of mixing and storing, and/or deliver the mixed product, and, in the meantime, unload the cars bringing in the new materials, i. e., they cannot carry on the unloading and storage of the new material and handle the material for mixing at the same time, and they cannot move the new material and the mixed product to the bins at the same time so that the mixing operation must be dropped when new material is received.

In the prior art plants, the materials are handled by wheel barrows, hand carts, traveling cranes and the like and the entire system is congested and clogged and production of the output stops whenever new material must be stored.

The improved apparatus is a completely mechanized plant in which practically all shifting of the material is performed by power operation and it is adapted to store and mix or bag separately or simultaneously and it can also distribute and store the mixture produced in the plant and perform the same function as to the new materials at the same time.

An important advantage in handling ammoniated super phosphates and other active mixtures which in combining involve a chemical reaction with the evolution of heat which tends to cause deterioration of the product is that the product in being transferred from the mixer to the bins is moved in the form of a thin fully exposed layer on a channel like or other conveyor belt or endless conveyor and is to a large degree cooled and is partially cured in this way. Dissipation of heat in taking to storage does not fully eliminate curing but the dissipation of heat occurring immediately as the ingredients are combined gives a more satisfactory granular product which is better adapted for use and particularly is more easily drilled when taken from the bins. This partial curing step is to some extent assisted by the thorough aeration which takes place in dropping the material from the longitudinal conveyor into the bin.

It is of importance that the plant, the arrangement of which is subject to variation, comprises a long line of bins, usually served by a railroad track and an elevator, the bins in said line being of considerable extent transversely to the line. In the plant as shown and described, the elevator which delivers from the railroad to the plant and the high tower mixer are approximately 220 feet from each end of the line of bins so that the mixed material is carried on the conveyor including its transverse distance an average of one hundred and eighty (180) feet and a maximum of about three hundred (300) feet and the more remote bins are generally selected for the mixture requiring such cooling or curing. The material is distributed to these bins by two sets of longitudinal endless conveyors comprising two conveyor lines parallel to each other above the line of bins and spaced apart to give two peaks to the heap of fertilizer deposited in the bins and hence better distribution and more economical storage. While one line of conveyors may be used, the two lines have important advantages hereinafter pointed out. Each of these conveyor sets or lines consists of two longitudinally transferable conveyors one above the other so that the material can be transferred from the upper conveyor to the lower conveyor of the same set at any point, and by overlapping these conveyors to the proper extent, the material can be carried automatically and delivered to any bin in the line. It may be noted that while each conveyor of each longitudinal set is less than half the length of the line of bins, the two conveyors of each longitudinal set taken together are slightly longer than the spacing of the elevator from the most distant end of the line of bins. To give the greatest scope in storing materials both north and south of the elevator, the longitudinal conveyors are to best advantage reversible.

In the form shown, which though it has important advantages, is subject to variation, the material is taken from the railway platform by the elevator and carried to an upper level where there is a transverse conveyor which can deliver the material either direct to one of the longitudinal conveyor sets, as by a funnel or chute or to a second transverse conveyor by which it is delivered to the other longitudinal conveyor unit. The last mentioned transverse conveyor is in the particular form shown, provided with reversing means whereby it may also feed the new material from the elevator direct to the hopper of a mixing apparatus, also referred to as a treating station and as a high tower mixer, said hopper being of very considerable storage capacity, indicated at 25 tons and adapted to supply the mixer for a considerable period. The apparatus also includes additional transverse conveyor means whereby the mixed material or product from the mixing plant may be carried or distributed to either of the longitudinal conveyors at the will of the operator for delivery to and storage in one of the bins of the line, it being feasible at the same time to store the new material from the elevator at the railroad platform by way of the other longitudinal conveyor, the elevator being connectible at the will of the operator to either of the longitudinal conveyors, also referred to as shuttle conveyors.

In the accompanying drawings, I have illustrated a dry mixing storage and distributing plant embodying the features of my invention in the preferred form.

In the drawings:

Fig. 2 illustrates the portion of the plant to the left of the broken line, Fig. 1.

Fig. 3 is an end view looking from the north or from the left in Fig. 1, the end wall of the building toward the observer being removed for convenience of illustration.

Fig. 4 is a fragmentary elevation showing the driving end of a self propelling shuttle conveyor and the track therefor which illustration may be treated as relating to the upper conveyor of the longitudinal conveyor set at the left in Fig. 1, all the shuttle conveyors being similar.

Fig. 5 is a fragmentary elevation showing the opposite end of the same conveyor unit.

Fig. 6 is a fragmentary top plan view showing the driving end of said conveyor unit.

Fig. 7 is an elevation of the main or high tower mixing apparatus shown at the right in Fig. 3 and looking in a direction opposite to that from which Fig. 3 is taken and also shown on the west side, i. e., nearest the observer in Fig. 1.

Figs. 8 and 9 are front and side elevations respectively of a low tower mixing unit shown at the right front or west side of the plant in plan Fig. 1.

Fig. 10 is an elevation, more or less diagrammatic in nature, of the distributing funnel nearest the observer in Fig. 3 and connected to receive the new material from the elevator.

Fig. 11 is an elevation, more or less of a diagrammatic nature, and in a plane parallel to the plan Fig. 3, showing the distributing funnel most remote from the observer in Fig. 3, the same being connected by a conveyor to receive material from the main or high tower mixer, tend to distribute to both shuttle conveyors.

Figure 1:
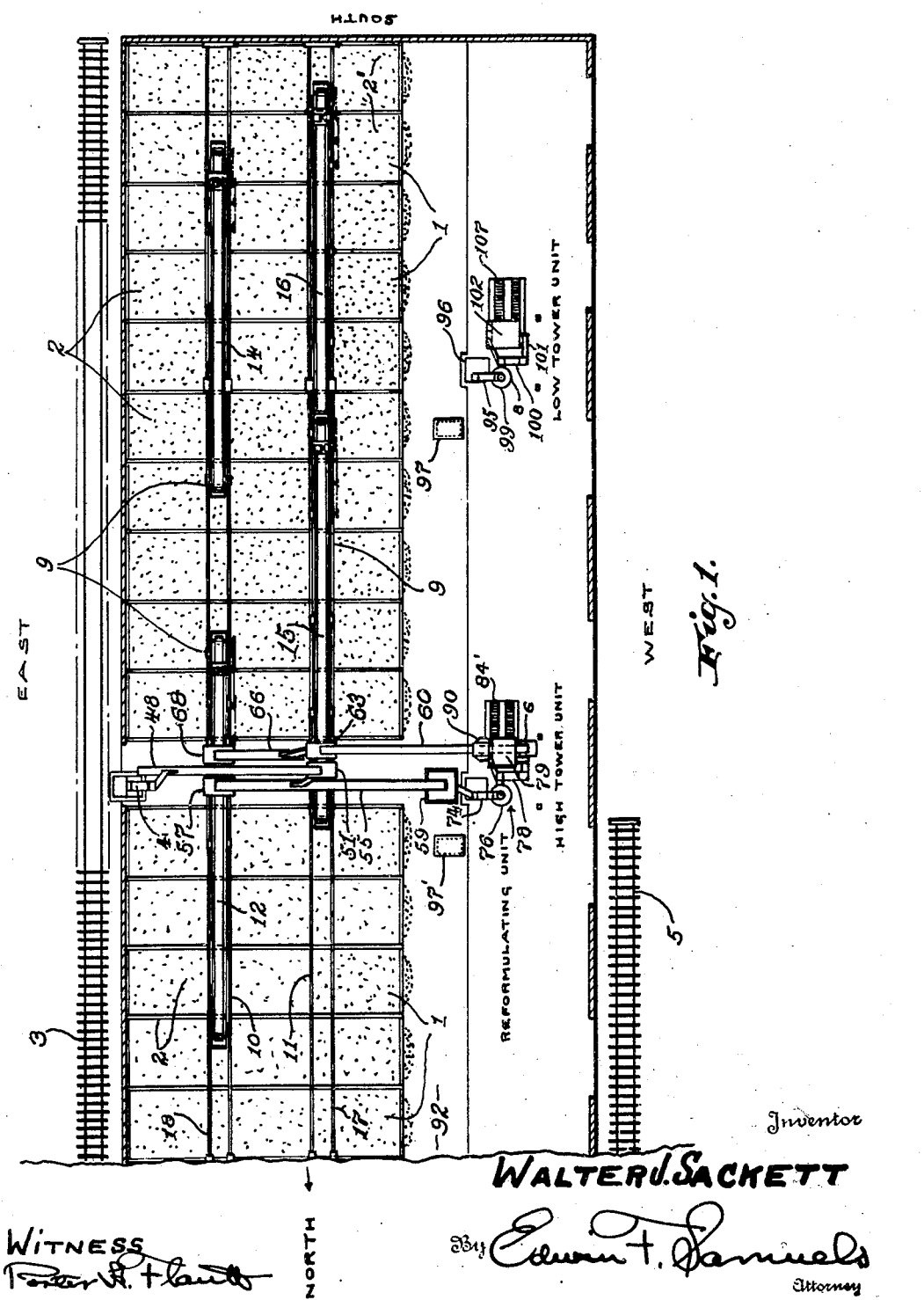
Fig. 1 is a diagrammatic top plan view of the line of bins, the longitudinal conveyors or shuttle conveyors as they are sometimes termed, serving the bins, the elevator and two mixing units, the left or north end of the plant being broken away for convenience of illustration.

Referring to the drawings by numerals, each of which is used to indicate the same or similar parts in the different figures, the construction shown comprises a long line of fertilizer bins said line being indicated as a whole by reference character 1, the bins per se being indicated by reference character 2. These bins are shown as elongated transversely to the line of bins 1 which is regarded as the most convenient arrangement.

The plant is served by a railroad siding 3, shown as on the east side of the plant remote from the observer in Fig. 1 and running along said line 1 closely adjacent the same and adapted to deliver to the main elevator 4 which is shown on the east side of said line near the longitudinal center of the line which is the most convenient arrangement for cooperation with the longitudinal conveyors.

On the west side of the plant there is a siding shown at 5, or other arrangement for delivering the material from the plant illustrated and also on the west side of the plant closely adjacent the bins and to best advantage directly opposite and aligned transversely of the line of bins with the elevator 4 is a high tower mixing plant indicated by reference character 6 and on the same side of the plant spaced southwardly of the high tower mixer 6 is equipment referred to as a low tower mixer principally for material to be placed directly in bags, the same being indicated by reference character 8.

A feature of primary importance in connection with the line 1 of bins 2 and the elevator 4 and mixer 5 is the system of longitudinal shuttle conveyors indicated in a general way by reference character 9. These conveyors are adapted to feed from either the elevator 4 or the mixer 6 any one of the bins 2 in the line 1 and to deposit the material in two peaks or at two spaced points in each bin giving much better economy of storage than can be obtained by depositing in each bin from a single point or peak.

These longitudinal conveyors 9, as already pointed out, are directly above the bins 2 of line 1 in two sets 10 and 11 spaced apart transversely and operating longitudinally of the plant or rather of the line 1 of bins 2, to best advantage being adapted to carry material from the elevator to each of the bins including the entire length of the plant. To this end, each set of conveyors 10 and 11 consists of two transferrable shuttle conveyors or conveyor members 12, 14, 15 and 16. The conveyors 12, 14 of set 10 and 15, 16 of set 11 are in the respective sets 10 and 11 arranged one above the other and adapted to be transferred each of them bodily along the line 1 and to overlap and deliver from one to the other, i. e., from the upper to the lower, in this way each set 10, 11 is adapted to deliver from the center of the plant in the area where the elevator is located to any one of the bins 2 in the line 1.

Referring now to Fig. 3, it will be noted that each conveyor set 10, 11 comprises two sets of tracks 17, 18, one above and directly overlying the other and preferably extending the entire length of the line 1 of bins 2.

While in the form of construction shown, two of the shuttle conveyors are shorter than the others, all shuttle conveyors 12, 14, 15 and 16 are well illustrated in Figs. 4, 5, and 6 which, all the shuttle conveyors being similar in construction, may be treated as showing the conveyor member or shuttle conveyor 12 on the upper track 18, at the left in Fig. 3 or any one of conveyors 12, 14, 15, 16.

While other constructions may be substituted, the shuttle conveyor 12, as shown, which applies to all the longitudinal or shuttle conveyors, consists of a frame 19 which may be composed of channel bars or the like and is elongated in the direction of the length of line 1, the shuttle conveyor 12 in the construction shown having an effective length of over 126 feet, the conveyor 14 having a corresponding length of a little over 100 feet. This conveyor frame 19 is mounted on wheels 20 which operate on the longitudinal track 18 of which there are four sets running the entire length of the plant or the line 1 of bins 2, it being, however, understood that a single set of conveyors and a line of bins of which each bin is of less length may be employed without departure from the spirit of the invention in its broader scope. Some important functions of the apparatus are however dependent on the two lines of conveyors spaced transversely as shown.

Each frame 19 is provided, at its opposite ends, with pulleys 21 and 22 suitably journalled in said frame to rotate on a transverse axis. These pulleys carry endless conveyor 24 which, in the present apparatus, is preferably a rubber belt though other types of endless conveyor may be employed.

In the preferred form shown, the conveyor belt 24 and each of the belts in the shuttle conveyors 12, 14, 15 and 16, as well as each of the transverse conveyor belts, is supported and given as to its upper flight a channel shaped cross section by means of inclined rollers 25, the bottom flight of the conveyor being supported by rollers 26.

In the form shown, each belt carriage frame 19 is provided at one end with a motor, the electric motor 27 operated by current brought from any suitable source by way of the flexible cable 28, has important advantages for this purpose. This motor 27 has its shaft 29 extending into a reducing gear casing 30 and driving the reducing gears therein and the reducing gears in said casing drive sprocket 31 which operates a chain 32 which in turn meshes with a sprocket 33 secured to the shaft of the drive pulley 22 which operates the conveyor belt or other suitable conveyor 24.

The shaft 34 carrying said pulley 22 has mounted to rotate freely thereon, a smaller sprocket 35 which drives a chain 36 which operates a sprocket 37 mounted on and secured to the shaft 38 on which are mounted and to which are secured the drive wheels 39 of the carriage or frame 19.

In the form shown there is a second chain 40 connecting the shaft 38 to the shaft 41 of a second set of drive wheels 42 thereby attaining greater traction for the drive of said carriage.

The sprocket 35 which drives the chain 36 is mounted for free rotation on the shaft 34 and is provided on its outer face with a clutch member 43 which is adapted to engage and to be operated by a co-operating clutch member 44 which is mounted on a spline or feather on the shaft 34 and movable along said shaft by a clutch lever 45 which throws the clutch member 44 into and out of mesh with the clutch member 43 on the sprocket 35. Thus the conveyor carriage 19 is moved along the track 18 by the power of the conveyor motor 27 on said carriage and the other shuttle conveyors are moved along the corresponding tracks by the corresponding motors of the other units.

It is of particular importance to note that in order to move the shuttle conveyor 12 in both directions and to all positions on the track and to move the other shuttle conveyors to any and all positions on the corresponding tracks, the motors 27 of all four shuttle conveyors are of the reversible type and incidentally this reversibility is almost essential to the operation of the conveyor belt itself and to each of them which to best advantage deliver in both directions from the elevator 4. It will be noted that the motor 27 is controlled by the reversing switch 46 in Fig. 4.

It may be noted that conveyor set 11 comprising shuttle conveyors 15 and 16 is in operative position for delivering from the elevator 4 via transverse conveyor 48 to the end bin 2' of the line of bins 1.

Having further reference to the shuttle conveyors 12, 14, 15 and 16 comprising sets 10 and 11, which are supplied from the elevator 4 by way of transverse conveyors to be described, these conveyors can, by suitable location and overlapping, be arranged to feed any bin in the entire line of bins 1. The long conveyors 12 and 15 on the upper track may be caused to deliver directly to the bins near the center or they may deliver on to the lower shuttle conveyors 14 and 16 respectively which in turn deliver into the bins which are too remote to be reached by conveyors 12 and 15, operating separately. In case the extra drop seems undesirable, as on account of some of the material missing the bin, both conveyors of either set may be used to reach any set. The materials being fine, such is the practice with the present apparatus.

Referring now particularly to Fig. 3, which is largely diagrammatic, Fig. 1 being likewise diagrammatic, there is a conveyor 48 which extends above and at right angles to the bins of line 1 said conveyor being preferably of the channel belt type and being operated by an electric motor 49 and suitable gearing not shown, which is likewise true of the remaining transverse conveyors to be described. This conveyor 48 may be of a slight upward inclination extending to the right from the delivery chute 50 of the elevator 4 which feeds on to said conveyor 48. This conveyor 48 deposits in a bifurcated funnel or drop chute 51, illustrated in detail in Fig. 10. This chute has two discharge openings or pipes, the longer of which 52 drops the material directly on the endless conveyor 24' of the shuttle conveyor 15 for which the conveyor 16 might, under some circumstances, be substituted as desired but the drop would be undesirably long on account of the lower position of conveyor 16 and the latter conveyor would be so employed only under unusual circumstances, to reach the center group of bins only. There is a butterfly valve or similar device 53 controlling the direction of the material through funnel 51'. Valve 53 is hand controlled to cause the material when desired to pass to the second or alternative discharge 54 which deposits at the will of the operator on a second transverse conveyor belt 55 which is preferably horizontal and is also preferably reversible being operated by a suitable electric motor 56 and suitable reduction gearing 56'. This conveyor is driven in either direction and reversed. The conveyors 48 and 55 and the other conveyors shown are centrally located as to the length of the line 1 of bins 2 and mounted on suitable pulleys and are preferably of rubber and of channel formation as are the longitudinal conveyor belts of the shuttle conveyors 12, 14, 15 and 16—all as to the upper flights only.

This transverse conveyor 55 which is preferably at right angles to the line 1 of the bins and beneath or practically beneath, i. e., directly underlying the first mentioned transverse conveyor 48, being shown as operable in either direction, delivers at both ends, i. e., at one end to the funnel 57 which drops the material on the conveyor 12 and at the other end said conveyor 55, at the will of the operator, i. e., by reversal, drops the material in the storage hopper 59 which operates in connection with, i. e., which feeds the mixer or high tower mixer 6.

The system of transverse conveyors shown also includes immediately adjacent the transverse plane of the conveyor 48 and the main elevator 4 a reversible conveyor 60 operated by a reversible motor 61 and reducing gear 61'. This conveyor extends through the mixing apparatus 6 in receiving relation to one delivery thereof and is intended to convey the mixed material or product from the mixer and at the will of the operator to discharge said material in bulk through the discharge hopper of the mixing apparatus at 62, said material being taken from the mixer only for discharge.

At its upper end this reversible belt 60 is adapted, at the will of the operator, to discharge the material from the mixer 6 into a funnel 63 shown in detail in Fig. 11 as bifurcated having one discharge pipe 64 somewhat elongated and leading downwardly and discharging to the shuttle conveyor 15.

The other discharge from the funnel 63 indicated by reference character 65 places the material on a conveyor 66 which is to the rear of the conveyor 55 in Fig. 3, and for convenience of illustration slightly above it. This conveyor is driven by a motor 67 and suitable gearing 67' and the conveyor is mounted on pulleys in accordance with the usual practice, conveyor 66 discharges by way of a funnel or guide 68 on to the shuttle conveyor indicated in a general way by reference character 12.

It will thus be apparent that in unloading from a freight car on the siding 3 the material is delivered from the elevator 4 by way of the discharge chute 50 on to the conveyor 48 which discharges it into the funnel 51 whereby it may be deposited directly on the belt of shuttle conveyor unit 15 to be delivered in the manner previously described, into any one of the bins 2 of the line 1, i. e., by the explained cooperation of shuttle conveyors 15 and 16 already fully described which has reference to the proper location of the conveyors and the overlapping thereof whereby they are adapted to deliver into any one of the bins. In handling the material they have a continuous operation. Where the drop is not too long for the material a single conveyor may be used for the central bins but with these light, fine materials the combination of the two conveyors in operating each set 10, 11, will be found generally desirable and the two overlapping conveyors of the set being employed are essential for the bins near the ends of the line. Each shuttle conveyor 12, 14, 15, 16 is preferably of a length equal to about one half the distance from elevator 4 to the remote end of line 1. The upper shuttle conveyor is generally a little longer and the lower shuttle shorter than the half measurement.

The conveyor 48 may also deliver by way of the funnel 51 using the discharge chute 54 thus placing the material on the conveyor 55 whereby it may be deposited on the upper shuttle conveyor 12 at the left in Fig. 3 and thus deliver by the operation of the set of upper and lower conveyors 10 to any one of the line of bins, the flow being continuous and absolutely controlled.

It has been noted that by delivering the material at two points in a bin, double peaks with increased economy are attained.

It is notable that the transverse endless conveyor 55 being reversible, is also adapted to deliver to the storage hopper 59 from chute 50 and belt 48 leading from the elevator 4.

To avoid confusion, it may be noted that the reversible belt 60 recently described does not receive material from the belt 48 but only from the mixing apparatus 6, delivering it by way of the funnel 63 either to the shuttle conveyor 15 for storage in the bins 2 of line 1 or to the short transverse endless conveyor 66 for deposit on the shuttle conveyor 12 of set 10 and hence for deposit in the bins. It is also pointed out when conveyor 60 is reversed from the operation first developed which is an operation contemplated, it delivers from the mixer to the outside by way of bulk discharge hopper 62.

The system of distribution of the material having been thus fully described, a brief description of the high tower mixing apparatus 6 which cooperates with the distributing plant in the manner discussed may be described.

It is of importance that the mixer 6, among other operations, is adapted to produce ammoniated fertilizers, ammonia being combined with super phosphates and other materials. In mixing such fertilizers, there is a chemical reaction which produces heat particularly at the time of mixing, also such products deteriorate if they remain too long heated and are considered to require seasoning. Other active mixtures are contemplated. The conveyor belt 60 receives these ammoniated materials in thin layers as does likewise the transverse conveyor belt 66 and the longitudinal shuttle conveyors 12, 14, 15 and 16 and from these latter the ammoniated materials are dropped into the pre-selected bin in a stream in which the particles are widely separated.

This manner of storing the ammoniated material has a highly beneficial effect in releasing the heat. While further curing in the bins is desirable the dissipation of the heat in this way immediately after mixing gives a more satisfactory and more granular and more easily drillable fertilizer than can be obtained by the usual practice of mixing and storing in piles to cure, in which latter process there is considerable deterioration. Also storing in bins without cooling is destructive of the sheet metal bins most generally used. The provision of this delivery with the mixing apparatus for this purpose is believed to represent an important advance in the production of a dry powderous product by chemical action resulting from applying a re-agent to a dry comminuted material where heating is involved and there is a tendency to deterioration.

Referring now to Fig. 7 which is an elevation of the high tower mixer 6 taken from the side opposite to that from which it is viewed in Fig. 3, the storage hopper 59 is shown at the right having a control valve 70 at its lower end which is directly over a batch mixing scale 71 from which the material, weighed in suitable quantities, is passed downwardly through a tube or pipe 72 into the receiving chute or funnel 73, of an elevator 74 into which the other ingredients likewise suitably weighed are also discharged. The apparatus is for mixing dry comminuted materials. The material in the hopper 59 is generally super phosphate and the other solid ingredients introduced at this time are the various bases either high or low in nitrogen and potash.

The upper end of the elevator 74 drops the material into a pipe 75 by which it is led to a dry mixer 76 which may be of any suitable type. This mixer discharges at 77 into an elevator 78 which carries the mixed materials upwardly to a screening apparatus 79 having a triple discharge 80 whereby the material from the screen may be disposed of in five different ways as hereinafter described. The triple discharge pipe 80 has three downwardly extending branches 83 and 87, toward the observer in Fig. 7 and extending to the left and to the right of the observer respectively and downwardly, as hereinafter described and passage 85 leads from the triple outlet 80, to the rear of passages 83 and 87 extending downwardly and delivering to reversible conveyor 60 which is preferably a rubber belt. The valve 81 determines primarily the delivery of the material from the screen directing it into the two front passages 83 and 87 or into passage 85 at the will of the operator and valve 81' determines delivery as between passsages 83 and 87 directing it into either of these passages 83 or 87 according to the position of the valve. Both valves are of the butterfly type extending upwardly from their shafts S and S', respectively.

The triple discharge 80 is primarily controlled by valve 81 whereby the materials may be led downwardly to the bagging apparatus 82 by way of passage 83 also controlled by valve 81' as just described. The bagging apparatus may include a scale 84 and a bag conveyor 84'.

Second, the material may be discharged by way of the pipe 85 direct from the screen on to the reversible conveyor 60 for storage in any of the bins 2 of the line 1 by way of either line of shuttle-conveyors as already pointed out, or, Three, the material may be discharged in bulk by way of the funnel 62 which is adapted for bulk shipments.

The third passage 87 leading from the screen 79 discharges into an elevator 88 leading to the ammoniator 90 and operated by a motor 89 and suitable speed control mechanism 89' shown in the form of a Reeves drive which controls the speed of elevator 88 whereby the constituents of the ammoniated materials are controlled as to their proportions, i. e., whereby the quantity of solids fed to the ammoniator is determined the discharge of liquid into said materials by the ammoniator also being variable, see supply pipe 89—a and variable quantity control therefor 89—b. The Reeves drive 89' is connected to the elevator 88 to drive the same by reducing trains of pulleys and belts or sprockets and chains 89''.

The elevator 88 discharges into the continuous ammoniator 90 which, in turn, discharges by way of the chute 91 on to the reversible conveyor 60 whereby the material is cooled and partially seasoned in passing to the bins 2 of the line 1, giving a fourth path of disposal or delivery of the material from the screen.

The ammoniated material may, if desired, be discharged at 62 which is a fifth path of delivery but advantage is generally taken of the opportunity to season the ammoniated fertilizer by delivery via conveyor 60 to conveyor sets 10, or 11. Bagging of the ammoniated material at 62 is not feasible on account of its active nature.

It is of interest that the complete fertilizer from the high tower mixer 6 may be returned by conveyor 60 and funnel 63 to either shuttle conveyor set 10 or 11, Fig. 1, and deposited in any one of the bins 2 of line 1, while new material from elevator 4 is being stored by way of conveyor 48 and funnel 51 and the other shuttle conveyor set of the two sets 10 or 11 in another bin 2. In storing, the mixture would be deposited from funnel 63 on conveyor 66 if the mixture is to be deposited on conveyor set 10 or it may be deposited directly on conveyor 15 of set 11 by funnel outlet 64. In storing the new material from elevator 4, it can be placed by funnel 51 directly on conveyor 15 of set 10 or in storing the same new material would be deposited from funnel 54 on conveyor 55 if the material is to be distributed by conveyor set 10. In storing both the mixture and the new material in different bins 2 at the same time both sets 10 and 11 would be used, one carrying the new material and the other the mixture. The reference character 94, Fig. 3, indicates a cat walk extending along each track 17, 18 of the respective shuttle conveyors 11, 14, 15, and 16.

The low tower mixer or bagging apparatus shown in Figs. 8 and 9 is indicated at 8 in Fig. 1. It is located adjacent the line of bins 1 and the floor 92 which floor extends along the entire line, the bins being adapted for opening on this side at and for five or six feet above the floor level for removal of the material according to the usual practice for mixing.

The high tower mixer 6 utilizes super phosphate direct from the cars, the storage hopper 59 being filled from time to time directly from the elevator 4 whenever new material is being taken in. This gives the most economical distribution of the material. All new material not capable of immediate use in the mixer 6 is stored in the bins 2 for redistribution as needed being fed from floor 92 to either mixer. The mixer 8 near the south end of the plant is mainly for mixing and bagging the material ready for delivery to the consumer in bags instead of in bulk. While bagging dry material is one of the functions of the high tower mixer, the bagging mixer 8 greatly adds to the maximum output of the plant and its flexibility; being operable when all the other units are busy and even used for bulk delivery in emergencies.

Fig. 8 is a view looking from the west, i. e., from the position of the observer in Fig. 1, and Fig. 9 is a view looking from the south, which is to the right of the observer in the same figure.

The low tower mixer comprises an elevator 95 with a hopper 96 disposed toward the bins 2 and at the level of the floor 92. The materials are weighed on a scale 97, Fig. 1, before introducing into the hopper 96 and are discharged from the elevator at the top by way of a pipe 98 into a mixer 99, i. e., a dry mixer which discharges at the bottom by way of a chute 99' which delivers the mixture to a second elevator 100. The elevator delivers the mixture by way of a pipe 101, see Fig. 8, to the screen 102. This screen has a pipe 103 similar to the one shown but not described in the high tower mixing apparatus 6 whereby the larger particles are returned to the elevator 100 and brought back to the screen for further treatment.

The screen 102 delivers by way of a chute or funnel 104 to a bagging funnel 105 which is bifurcated as shown in Fig. 9 to provide for two bagging operations simultaneously.

Any suitable bagging scale adapted to this purpose is indicated at 106 and 106' and the filled bags are carried by bag conveyors 107 to a sewing machine, not shown, where they are closed and made ready for delivery.

It is of particular importance that the apparatus is capable of receiving and distributing and storing new material and of mixing and storing the mixture at the same time, i. e., simultaneously with the storing of the new material and that the apparatus is also capable of being operated solely for storing the new material with two peaks in each bin by alternate use of the longitudinal conveyor sets and it is also adapted for mixing new and stored material and for distributing the mixture by separate or alternate use of the longitudinal conveyor.

It is also of interest that the low tower mixing apparatus is particularly adapted to mixing with other ingredients the mixtures containing ammoniated super phosphates and other active materials after they have been seasoned in the bins, and is usable for various other mixing jobs and particularly for bagging.

It also should be noted that the delivery of the active mixtures or products as ammoniated super phosphates from the high tower mixer to the bins by the elongated conveyor as rubber belts on which they are spread in a thin layer is of great assistance in that it provides for immediate partial seasoning of the active mixture and the dissipation of heat, not only preserving or preventing injury to the metallic conveyor but also improving to a very considerable extent the quality of the product as stored. The latter when seasoned in this way, i. e., immediately after combining, is more granular and more easily drillable than products not so seasoned, deterioration by storage in full heated condition being avoided. In the apparatus shown, this layer of material on the conveyor carrying the material as in Figs. 8 and 10 is about 8 to 10 inches wide and 3 or 4 inches thick, tapering to no thickness at the longitudinal edges.

The arrangement of the two longitudinal shuttle conveyors in combination with the line of bins and the combination of these elements with the transverse conveyors represent an important improvement, giving increased speed and facility in the distribution of the material to the bins as well as improved quality incident to prompt cooling of certain heated and more or less unstaple products.

The combination of the shuttle conveyor and transverse conveyor with the elevator 4, storing hopper 59 and mixer 6, as described, represent the solution of a long existing problem in that the delay in production incident to distributing new material is thereby overcome.

It is also important that all hand operations in storing new materials and mixtures are dispensed with.

I have thus described a mixing and distributing plant and a method of operation embodying the features of my invention in the preferred form, the description being specific and in detail in order that the manner of constructing, applying, operating and using the invention may be fully understood. However, the apparatus and methods described are capable of considerable variation in practice and arrangement, in accordance with the purposes and intent of the invention and without departure from the spirit of the invention and some of the features of the apparatus are capable of more general application, hence the terms herein are used descriptively rather than in a limiting sense, the scope of the invention being defined in the claims.

What I claim as new and desire to secure by Letters Patent is:

1. The combination in a fertilizer mixing and storage plant of a long line of bins, an elevator for supplying new material to said line intermediate its length, two parallel lines of conveyors extending longitudinally of said line above said bins and spaced apart in a horizontal direction transversely of said line, each said conveyor having an elongated carrier on which it is mounted and means for transferring each carrier and the conveyor thereon along said line to deposit material in any one of said bins, transverse conveyor means and means controllable selectively by the operator to feed the material from the elevator to either of said longitudinal conveyors said transverse conveyor means, comprising two transverse conveyors including a first conveyor, leading from said supply elevator and having a plurality of discharge means, the first discharging on one of said longitudinal conveyors, the second transverse conveyor extending adjacent the discharge of the first conveyor, and having a discharge to the other longitudinal conveyor, the second discharge from the first transverse conveyor leading to the second transverse conveyor, and means for controlling the discharge of said first transverse conveyor so that it delivers either to the said longitudinal conveyor or to the second transverse conveyor.

2. The combination in a fertilizer mixing and storage plant of a long line of bins, an elevator for supplying new material to said line intermediate its length, two parallel lines of conveyors extending longitudinally of said line above said bins and spaced apart in a horizontal direction transversely of said line each said conveyor having an elongated carrier on which it is mounted and means for transferring each carrier and the conveyor thereon along said line to deposit material in any one of said bins and transverse conveyor means and means controllable selectively by the operator to feed the material from the elevator to either of said longitudinal conveyors, a mixer adjacent said line, a storage hopper with connections for feeding said mixer from said hopper, said transverse conveyor means including a reversible conveyor for feeding to said hopper or one of said longitudinal conveyors selectively and a conveyor for delivering the product from said mixer to said transverse conveyor means with additional selective means for transferring said product to either of said longitudinal conveyors at the will of the operator.

3. The combination in a fertilizer mixing and storage plant with a line of bins of two shuttle conveyor sets each set comprising two overlying parallel tracks, an elongated endless conveyor and a carrier therefor on each said track each upper conveyor being adapted to deliver to the corresponding lower conveyor, and the tracks of said respective sets being spaced apart longitudinally and extending along said line immediately above said bins to provide for delivering material in two peaks correspondingly spaced in each bin, each endless conveyor operating in the direction of the length of said line, an elevator and conveyor means transverse to the length of said line at said elevator adapted to deliver comminuted material from said elevator to the upper conveyor of said sets, and selective means controllable by the operator for determining the conveyor set to which the material is fed.

4. The combination in an apparatus of the type described of a line of bins, said bins being of considerable extent transversely to said line, two sets of transferrable conveyors extending longitudinally of said line of bins directly above the bins and spaced apart in a horizontal direction each said conveyor set comprising two tracks running longitudinally of said line, one track of each set being directly over the other, an elongated conveyor carrier on each track, a complete endless conveyor on each said carrier and operating longitudinally of said line, the end of the upper conveyor of each set being adapted to deliver to any point on the upper flight of the lower conveyor of the same set, means for moving each said carriage along each said track, an elevator intermediate said line of bins, the conveyors of each set being of a combined length approximately equal to the spacing of the elevator from the end of the line of bins, a transverse conveyor and operator controllable selective means for feeding the material from said elevator to the top conveyor of either set of conveyors, said means including a second transverse conveyor beneath said first mentioned transverse conveyor a treating station on the opposite side of said line from said elevator, said second transverse conveyor having reversible driving means, a storage hopper beneath the end of said latter transverse conveyor opposite said elevator and adjacent said treating plant, a transverse conveyor leading from and delivering from said treating plant and having delivery means controllable by the operator to deliver to the top conveyor of either of said lines of longitudinal conveyors and means for leading material from said storage hopper to said treating plant.

5. The combination in an apparatus of the type described of a line of bins, the individual bins being of considerable extent transversely to said line, two sets of longitudinally transferable endless conveyors, said sets being spaced apart laterally of said line, each said set comprising two tracks running longitudinally of said line, one track of each set being directly over the other, an elongated conveyor carrier on each said track, a complete endless conveyor on each said carrier and operating longitudinally of said line, the upper conveyor of each set being adapted to deliver to the lower conveyor of the same set, means for moving each said carrier along said track, transversely operating conveyor means intermediate the length of said line and selectively controllable for delivering from said transverse feeding means to the upper conveyor of either set, the conveyors of each set being of a combined length approximating the distance from said transversely operative means to the end of the line of bins whereby material can be delivered by each said line from said transversely operating means to any bin in said line.

6. The combination in a fertilizer mixing and storage plant of a line of bins, two sets of conveyors spaced apart transversely of said line in a horizontal direction and extending side by side along said line of bins above the same, each set comprising a longitudinal conveyor one above the other, the lower conveyor of each set having a carrier and track whereby it is transferable bodily in the direction of the length of said line, the upper conveyor being adapted to deliver to the lower conveyor of each set and the lower to the bins, an elevator intermediate of said line and immediately adjacent the same and a fertilizer mixer on the said line opposite the elevator, transverse conveying means and means adapted for selective control for moving the material continuously from said elevator to the upper conveyor of either of said longitudinal sets of conveyors, a storage hopper operating in feeding relation to said mixer, said transverse conveying means including means for delivering continuously from said elevator to said hopper, means controllable by the operator for moving the material from said mixing plant selectively to the upper conveyor of either of said longitudinal conveyor sets whereby the new material from said elevator and the material from said mixing plant may be stored simultaneously in the respective bins of said line, and the mixer may be supplied directly with new material from said elevator.

7. In a fertilizer mixing apparatus having a dry mixer and a screen and means for delivering fertilizer material to the mixer and for delivering it from the mixer to the screen, the combination of means for delivering the screened material from the screen on a plurality of paths, means for selectively controlling said paths to pass the material along either of said paths to the exclusion of the other paths, an ammoniator having an ammoniator conveyor for feeding the material thereto, an endless reversible conveyor of chemically resistive material having a delivery hopper at one end and delivery conveyors of similarly resistive material operatively connected to said endless conveyor at its other end and a series of storage receptacles in receiving relation to said distributing conveyors, said selectively controlled paths, leading from said screening apparatus to said reversible conveyor direct and to said ammoniator conveyor, said ammoniator also having delivery means discharging on to said reversible belt.

WALTER J. SACKETT.